(12) United States Patent
Werkmeister et al.

(10) Patent No.: US 11,440,083 B2
(45) Date of Patent: Sep. 13, 2022

(54) CONNECTING ELEMENT AND COMPONENT CONNECTION AND METHOD FOR THE PRODUCTION THEREOF

(71) Applicant: EJOT GMBH & CO. KG, Bad Berleburg (DE)

(72) Inventors: Marco Werkmeister, Leinatal (DE); Gerhard Dubiel, Tambach-Dietharz (DE); Angelique Brandau-Wolff, Tambach-Dietharz (DE)

(73) Assignee: EJOT GMBH & CO. KG, Bad Berleburg (DE)

( * ) Notice: Subject to any disclaimer, the term of this patent is extended or adjusted under 35 U.S.C. 154(b) by 0 days.

(21) Appl. No.: 17/254,240

(22) PCT Filed: Jun. 21, 2019

(86) PCT No.: PCT/EP2019/066532
§ 371 (c)(1),
(2) Date: Dec. 18, 2020

(87) PCT Pub. No.: WO2019/243607
PCT Pub. Date: Dec. 26, 2019

(65) Prior Publication Data
US 2021/0268569 A1 Sep. 2, 2021

(30) Foreign Application Priority Data

Jun. 21, 2018 (DE) .................. 10 2018 114 982.4

(51) Int. Cl.
*B21J 15/02* (2006.01)
*F16B 5/04* (2006.01)
*F16B 19/08* (2006.01)

(52) U.S. Cl.
CPC ............ *B21J 15/025* (2013.01); *F16B 5/04* (2013.01); *F16B 19/086* (2013.01)

(58) Field of Classification Search
CPC . B21J 15/025; B21J 15/12; F16B 5/04; F16B 19/086; F16B 5/08; B23K 2101/18;
(Continued)

(56) References Cited

U.S. PATENT DOCUMENTS 3,364,807 A 1/1968 Holton
6,802,682 B2 10/2004 Stevenson et al.
(Continued)

FOREIGN PATENT DOCUMENTS

CN 101468421 7/2009
CN 102248112 11/2011
(Continued)

OTHER PUBLICATIONS

Machine Translation of Wang; CN102615508A, Aug. 1, 2012 (Year: 2012).*
(Continued)

*Primary Examiner* — Ryan J. Walters
(74) *Attorney, Agent, or Firm* — Woodling, Krost and Rust (57) ABSTRACT

The invention relates to a connecting element (10) having a hollow-cylindrical shaft (12) and a drive (16), via which the shaft (12) can be driven in a direction of rotation, wherein the hollow-cylindrical shaft (12) has at least one free end, wherein the drive (16) is arranged opposite the free end, wherein a hollow space is formed by the hollow-cylindrical shaft (12). The invention is characterized in that driver structures (22) acting in the circumferential direction of the hollow-cylindrical shaft (12) are arranged in the hollow space, which, projected on the lateral surface, are arranged to extend in the setting direction on the lateral surface, rectilinearly parallel to the element mid-axis (M) or with an
(Continued)

angular deviation of at most 20° with respect to the element mid-axis (M), and/or are arranged at the end on the drive side.

5 Claims, 5 Drawing Sheets

(58) Field of Classification Search
CPC .............. B23K 2103/10; B23K 20/126; B23K 20/127; B23K 20/2336
See application file for complete search history.

(56) References Cited

U.S. PATENT DOCUMENTS

| | | | |
|---|---|---|---|
| 8,434,962 B2 | 5/2013 | Christ et al. | |
| 8,486,508 B2 * | 7/2013 | Christ | B23K 20/1295 428/139 |
| 2003/0167620 A1 | 9/2003 | Wang et al. | |
| 2004/0247414 A1 | 12/2004 | Pearce et al. | |
| 2012/0243960 A1 | 9/2012 | Ivinson et al. | |
| 2016/0332215 A1 | 11/2016 | Blacket et al. | |
| 2019/0039119 A1 | 2/2019 | Li et al. | |

FOREIGN PATENT DOCUMENTS

| | | |
|---|---|---|
| CN | 102615508 | 8/2012 |
| CN | 104329245 | 2/2015 |
| JP | 2002174219 A | 6/2002 |
| JP | 2003071574 A | 3/2003 |
| JP | 2003106316 | 4/2003 |
| KR | 101622959 B1 | 5/2016 |

OTHER PUBLICATIONS

German Patent and Trademark Office, Search Report, dated Feb. 5, 2019, pp. 1-14, German Application No. 102018114982.4.
European Patent Office, English Translation of the International Search Report, dated Oct. 24, 2019, pp. 1-3, International Application No. PCT/EP2019/066532.
European Patent Office, Written Opinion, pp. 1-8, International Application No. PCT/EP2019/066532.
Chinese National Intellectual Property Administration, Notification of First Office Action, dated Apr. 8, 2022, pp. 1-8, Application No. 201980052611.1.
Chinese National Intellectual Property Administration, Notification of First Office Action, dated Apr. 8, 2022, pp. 1-7, Application No. 201980052611.1, English Translation.

* cited by examiner

CONNECTING ELEMENT AND COMPONENT CONNECTION AND METHOD FOR THE PRODUCTION THEREOF

This patent application is the national phase entry of PCT/EP2019/066532, international application filing date Jun. 21, 2019, which claims the benefit and priority of and to German patent application no. 10 2018 114 982.4, filed Jun. 21, 2018.

PCT/EP2019/066532, international application filing date Jun. 21, 2019 and German patent application no. 10 2018 114 982.4, filed Jun. 21, 2018 are incorporated herein by reference hereto in their entireties.

FIELD OF THE INVENTION

The invention relates to a connecting element and to a method for the production of a component connection as well as to a component connection.

BACKGROUND OF THE INVENTION

Connecting elements are known in the prior art that are used to connect two superimposed component layers. These connecting elements are also known as semi-tubular self-piercing rivets. US 2016/0332215 A1 discloses such a semi-tubular self-piercing rivet that is driven to rotate, which rotation causes the contact area between the rivet and the base layer to heat up, thus making it easier for the rivet to penetrate the base layer. Furthermore, holding structures are provided within the hollow space of the connecting element so as to prevent axial loosening of the slug retained within the rivet.

SUMMARY OF THE INVENTION

It is the object of the invention to provide a connecting element for producing a component connection which will result in enhanced shear strength of the superimposed component layers.

In a manner known per se, a connecting element has a shaft and a drive via which the shaft can be driven in one direction of rotation, wherein the hollow-cylindrical shaft has at least one free end, wherein the drive is arranged opposite the free end, and wherein a hollow space is formed within the shaft by the hollow-cylindrical shaft.

According to the invention, driver structures acting in the circumferential direction of the hollow-cylindrical shaft are arranged in the hollow space. On the lateral surface, these driver structures extend rectilinearly parallel to the element axis, or with an angular deviation of no more than 20° with respect to the element axis projected on the lateral surface, and/or the driver structures are arranged at the end on the drive side.

The driver structures are used to sever a slug cut from the top layer of the component connection by the hollow-cylindrical shaft and to rotate the slug along with the shaft, so that rotation of the slug together with the connecting element allows the slug to be welded to the base layer. The slug welded to the base layer extends within the top layer and thus creates a positive connection in the direction of shear. This significantly increases the shear strength between the base and the top layer.

Preferably, the connecting element has a shoulder connected to the shaft. In addition to the positive connection, this also creates a positive connection between the top layer and the shoulder along the longitudinal axis of the connecting element. This not only results a strong connection of two components in the transverse direction but also in the longitudinal direction, especially when the shaft is flared in the base layer in a riveting process following welding of the slug.

In a first embodiment, the shoulder can be part of a head closing the shaft. This is a particularly simple design that resembles a rotatable semi-tubular self-piercing rivet.

Alternatively, the shoulder can also be designed in the form of an annular shoulder having a central recess whose smallest diameter corresponds at least to the inner diameter of the hollow-cylindrical shaft. As a result, a positive connection can be made between the annular collar and the top layer, while still allowing the slug material to pass upwards through the hollow-cylindrical shaft. The material having risen therein can then be reused to form the head. All in all, the amount of material entering into the component connection is thus small, which also results in a lower overall mounting height.

The central recess is preferably designed in such a way that its diameter increases in a direction away from the free end of the shaft. This creates a larger volume for accommodating the material of the slug, and a shoulder geometry can thus be created that can be pressed more easily in the direction of the top layer when an axial force is applied.

Preferably, the drive is formed in the head and/or in the shoulder. This makes for a particularly efficient transmission of the rotary motion.

According to another preferred embodiment, driver structures arranged at the end on the drive side are formed into the underside of the head.

In a particularly advantageous manner, the driver structures, which extend on the lateral surface rectilinearly parallel to the element mid axis, or with an angular deviation of 20° with respect to the element mid axis projected onto the lateral surface, are of a raised design. This has the advantage that the raised structures can press into the slug wall more easily, thus ensuring reliable rotary entrainment of the slug. When viewed in cross-section, with driver structures of a raised design, the level which is further inside radially is of a smaller area than the level which is further outside radially.

In addition to or instead of raised driver structures, the driver structures extending on the lateral surface rectilinearly parallel to the element mid-axis or with an angular deviation of 20° with respect to the element mid-axis projected onto the lateral surface can be designed in the form of grooves.

According to another preferred embodiment, a cutting edge, especially in the form of a chamfer, may be provided on the free end. This on the one hand facilitates cutting a slug out of the top layer and on the other hand makes it easier for the connecting element to penetrate the base layer, in which layer the free end will then be subjected to a deformation process in order to flare it.

In particular, the connecting element is made of a ferrous metal, especially steel.

The overall length of a connecting element according to the invention is preferably less than 2.5 times the outer diameter of the hollow-cylindrical shaft, and is in particular less than 10 mm.

According to yet another aspect of the invention, it relates to a method for the production of a component connection between two component layers, comprising a base layer and a top layer arranged thereon, in which method an axial force is applied to a connecting element having a hollow-cylindrical shaft to rotatingly drive the element into the top layer. The interior of the shaft cuts a slug out of the top layer, which slug will be entrained within the connecting element as it rotates. A downforce will act on the slug as it rotates, causing it to be welded to the base layer, whereupon at least part of the connecting element will be pressed into the base layer.

Preferably, the speed at which the connecting element is driven until the slug is welded is at least 2,000 rpm.

For this purpose, the connecting element can have a semi-hollow shaft or a hollow shaft, each with or without driver structures.

In a further development of the production method according to the invention, it can comprise at least a first process step in which the connecting element is placed on the shaft at high speed, in particular of more than 5,000 rpm, and with an axial force of in particular less than 3 kN. This will reliably prevent deformation of the connecting element as the slug is cut out until the connecting element has reached the surface of the base layer.

According to the invention, a second process step can furthermore be carried out, in which the cut-out slug is welded to the base layer by applying an axial downward force to the slug as the latter continues to rotate, at the same time increasing the axial force exerted by the tool as compared to the initial force. This force can preferably exceed 6 kN. The speed can be the same as in the first stage or it can be reduced in order to largely prevent sliding between the slug and the bottom component layer.

The second process step can begin once, starting from the initial position, the connecting element has passed through the thickness of the top layer in an axial direction.

The pressing force can be exerted on a connecting element which has a head closing the hollow-cylindrical shaft opposite its driving direction, from where this force is then exerted on the slug via the head of the connecting element.

According to the invention, the connecting element is furthermore open against the driving-in direction at least over the hollow space of its hollow-cylindrical shaft and the pressing force is applied directly to the slug by a setting tool which also applies the pressing force to the connecting element.

Moreover, according to the invention, a third process step can be carried out. The third process step can be executed subsequently to the second process step or immediately after the first process step. In this process step, the connecting element and the slug are subjected to an axial force of in particular more than 8 kN, which is increased compared to the frictional axial force of the second process step, with the speed being reduced, in particular to zero. This allows the connecting element to be positively connected in an axial direction to the base layer and/or the top layer. Preferably, the second process step is completed and the third process step is initiated just before the head makes contact with the top board, in particular when the underside of the head is spaced between $1/10$ mm and $5/10$ mm from the top layer. Thus, based on the known thickness of the component layers and dimensions of the connecting element, a relative travel length can be calculated in advance. The third stage is preferably completed after a specified time period, which period is between 0.1 s and 0.5 s.

In particular in the first and second process steps, the axial force and the speed are adjusted with a view to keeping them as constant as possible. The same adjustment is carried out in the third process step. Such an approach results in the connecting element penetrating the component connection under axial force and rotation.

If the connecting element was open against the insertion direction at least over the hollow space of the hollow-cylindrical shaft and the contact pressure is applied directly to the slug by a setting tool that also applies the contact pressure to the connecting element, so as to cause the slug to flare at its end opposite to the insertion direction. In this way, a positive connection can be created between the slug and the top layer. In this case, the slug can either be positively connected to the top layer indirectly, i.e. via the connecting element, or directly thereto.

The method according to the invention is preferably used to produce a component connection comprising at least one layer of a magnesium alloy and/or at least one layer of an aluminum alloy, in particular AL 5xxx, Al 6xxx or Al 7xxx. For this purpose, a speed of approx. 8,000 rpm is set at an axial force of approx. 2 kN for the first process step, and a speed of approx. 5,000 rpm is set at an axial force of approx. 8 kN for the second process step. In the third step, the axial force is adjusted to approx. 9 kN and the speed is adjusted to 0 rpm. In this arrangement, the connecting element is preferably a steel. "Approximately" in this context means a deviation of plus or minus 20%.

The invention furthermore relates to a component connection comprising a base layer and at least one top layer arranged thereon, as well as to a connecting element having a hollow-cylindrical shaft and a drive via which the shaft can be driven in the direction of rotation. The hollow-cylindrical shaft has a free end, with the drive being arranged on the end of the shaft opposite its free end. A hollow space is formed by the hollow-cylindrical shaft.

Part of the hollow-cylindrical shaft at the free end of the shaft is completely surrounded by the base layer, with the interior of the hollow-cylindrical shaft accommodating a slug cut out of the top layer.

Within the hollow space of the connecting element, there is a material connection between the base layer and the slug.

Preferably, driver structures acting in the circumferential direction of the hollow-cylindrical shaft are arranged in the hollow space, which driver structures are enclosed by the material of the slug and furthermore, there is a material connection between the base layer and the slug.

Preferably, the component connection can comprise a positive connection acting in the axial direction created by shaping radially displaced material of the slug protruding axially beyond the top layer into a collar that provides the positive connection to the top layer and/or the connecting element.

According to another advantageous embodiment, a positive connection acting in the axial direction can be achieved by a positive fit of the connecting element with the top layer and a positive fit of the connecting element of the base layer.

In particular, the positive connection to the base layer is achieved by flaring the free end of the connecting element that faces the insertion direction.

The connecting element has a higher strength than the base layer and the top layer. This ensures that the slug is reliably cut out of the top layer and that the connecting element is able to penetrate the base layer.

As a rule, the base layer and top layer can be made of a non-ferrous metal and the connecting element can be made of a steel or a non-ferrous metal.

Alternatively, the base layer and the top layer, or the top layer only, can be made of a thermoplastic material and the connecting element can be made of a plastic material or a steel or a non-ferrous metal.

In a particularly advantageous embodiment, the connecting element of the component connection is of the design described above.

Additional advantages, features and possible applications of the present invention may be gathered from the description which follows in which reference is made to the embodiments illustrated in the drawings.

Figure 1:
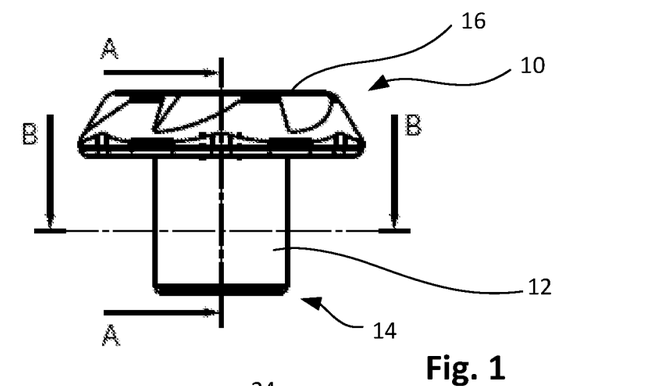
FIG. 1 is a lateral view of a connecting element according to the invention.

The lateral view of FIG. 1 shows a connecting element 10 according to the invention for connecting a base layer to a top layer arranged thereon. The connecting element 10 comprises a hollow-cylindrical shaft 12 having a free end 14 and having a drive 16 arranged on the end of the hollow-cylindrical shaft 12 opposite its free end 14. The drive 16 is designed as an external drive and has corresponding positive locking structures. The connecting element 10 will be described in more detail below with reference to the following figures.

Figure 1A:
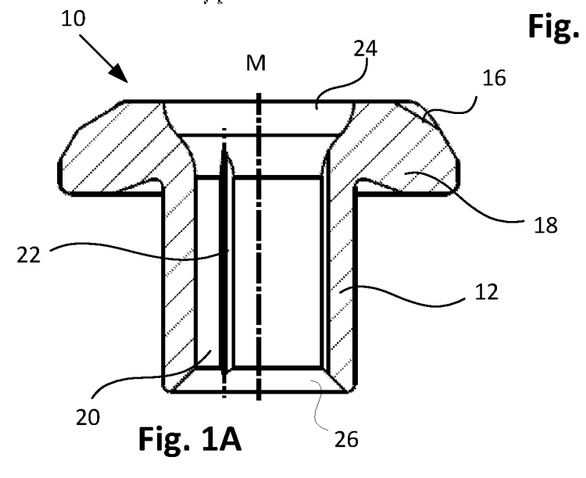
FIG. 1A is a sectional view of a connecting element according to the invention as seen in FIG. 1.

FIG. 1A is a sectional view of the connecting element 10. Illustrated in this view is a hollow-cylindrical shaft 12 and a collar 18 with a drive 16 formed into it. The hollow-cylindrical shaft 12 has ribs 22 on its inner lateral surface 20, which ribs in this example extend over the entire length of the hollow-cylindrical shaft 12. The ribs 22 of the connecting element 10 serve to entrain a slug removed from the top layer during the rotational movement of the connecting element 10. Entraining the slug in the rotational movement of the connecting element allows the slug to be integrally bonded to the base layer in a friction welding process.

The free end 14 of the hollow-cylindrical shaft 12 is provided with a chamfer 26 to facilitate penetration of the top layer and, if necessary, to allow the hollow-cylindrical shaft 12 to be flared in a deformation process in the base layer.

This view also shows the ribs 22 which run parallel to the element mid-axis M of the connecting element 10.

Figure 1B:
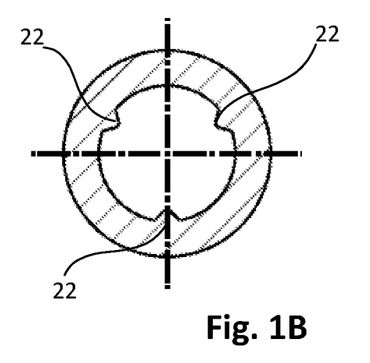
FIG. 1B is a view of a cross-section taken through the shaft of the connecting element of FIG. 1.

FIG. 1B is a view of a cross-section taken along lines B-B through the shaft 12 of the connecting element 10. As seen in this view, the present embodiment has three ribs 22 arranged on the lateral surface 20. These ribs 22 act to entrain a slug punched out of the top layer in the rotary motion of the connecting element so that a welded joint can be made between the slug and the base layer on the front face side.

FIG. 1A clearly shows that the connecting element 10 is completely hollow. The collar 18 thus extends around an opening 24 which flares axially in a direction opposite to the free end 14 of the shaft 12. In this way, material removed from the top layer is passed through the connecting element 10 during the joining process, thus creating a positive fit between the connecting element and the slug.

Figure 2:
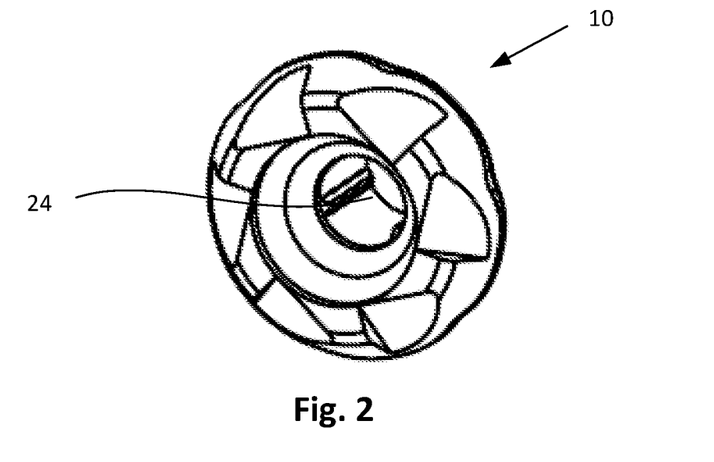
FIG. 2 is a perspective view of the connecting element of FIG. 1 with the collar as seen from above.

FIG. 2 is a perspective view of the connecting element 10 according to FIG. 1. Seen particularly clearly in the view of FIG. 2 is the opening 24 in the middle of the connecting element 10. This opening 24 fills up completely in the connecting process so that a tight connection is guaranteed. The opening 24 proves to be advantageous especially for connections where no positive connection is established between the connecting element and the base layer.

The method for producing a component connection will now be described in more detail with reference to FIGS. 5a to 5c.

Figure 3:
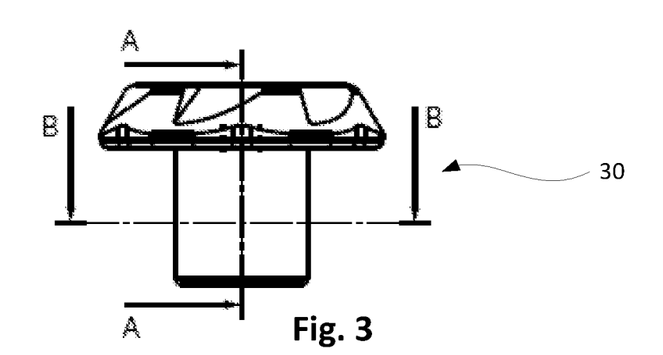
FIG. 3 is a lateral view of another embodiment of the connecting element according to the invention.
Figure 3A:
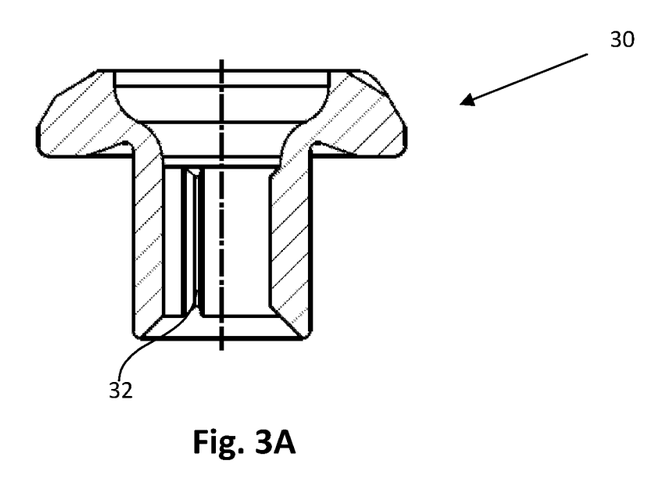
FIG. 3A is a sectional view of a connecting element as seen in FIG. 3.
Figure 3B:
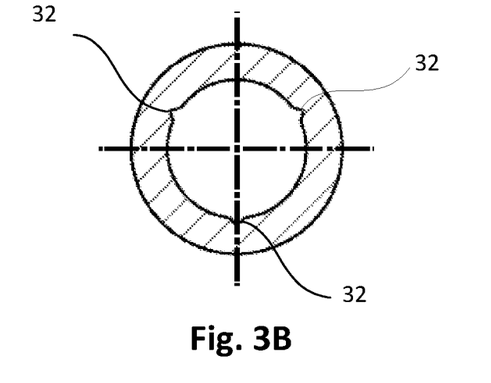
FIG. 3B is a view of a cross-section taken through the shaft of the connecting element of FIG. 3.

FIG. 3, FIG. 3A and FIG. 3B are views of another embodiment of a connecting element 30 according to the invention. FIG. 3A is a sectional view taken along lines A-A of FIG. 1 of connecting element 30. This connecting element 30 substantially corresponds to the connecting element 10 described with reference to FIG. 1. The embodiment of FIG. 3 differs from the one of FIG. 1 in that in this case, the driver structures are not in the form of ribs 22 but in the form of grooves 32. This can be seen particularly well in the cross-sectional view taken along lines B-B through the shaft FIG. 3B.

Figures 4, 4A, 4B:
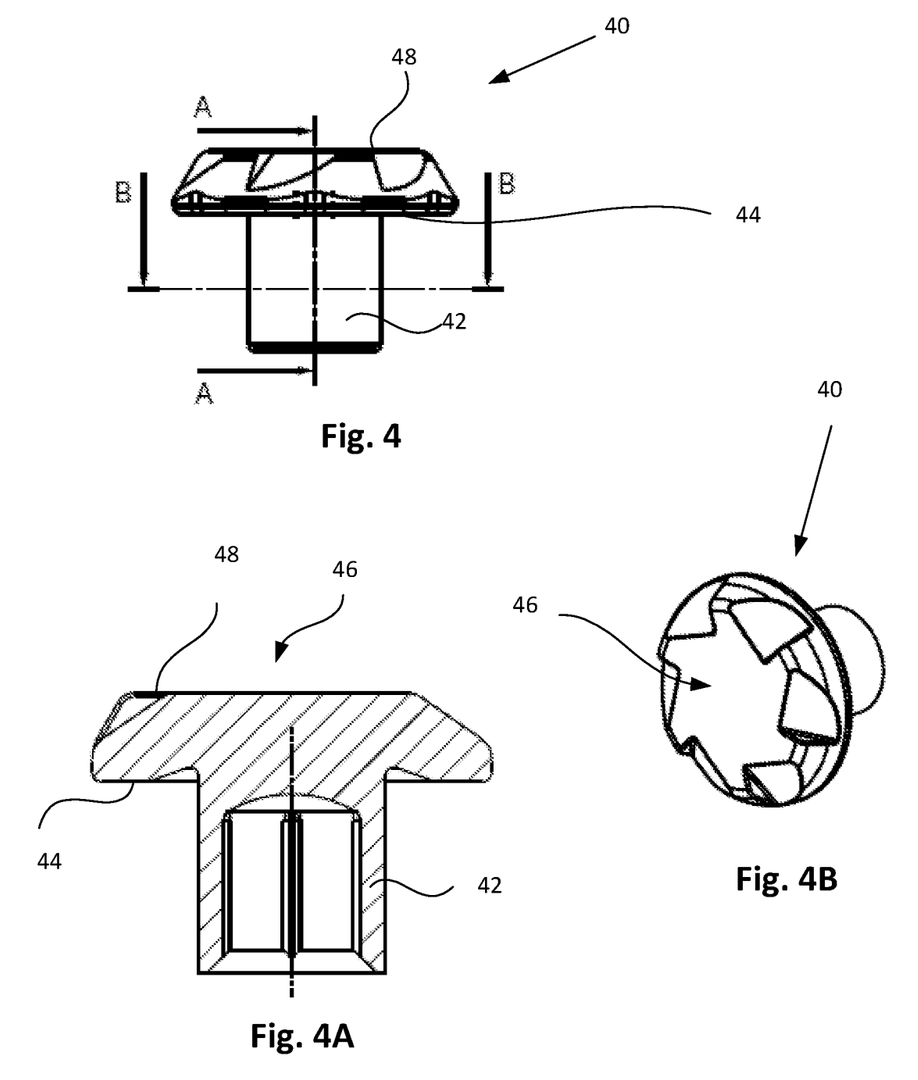
FIG. 4 is a lateral view of another connecting element according to the invention.
FIG. 4A is a sectional view of a connecting element as seen in FIG. 4.
FIG. 4B is a view of a cross-section taken through the connecting element of FIG. 4.

FIG. 4 is a view of another embodiment of a connecting element 40, which, as in FIG. 1, has a shaft 42, but the drive 48 is not arranged on a collar 44 but on a head 46 that is provided with the collar 44. In this embodiment, the head 46 forms the end of the hollow-cylindrical shaft 42 at its head-side end, as shown in the sectional view of the connecting element 40 taken along lines A-A of FIG. 4A. In this embodiment, the material cut out of the top layer cannot escape from the connecting element. In this embodiment, the force on the slug is applied via the head 46.

FIG. 4B is a perspective view of the connecting element 40 illustrating the closed surface of its head 46.

Figure 5A:
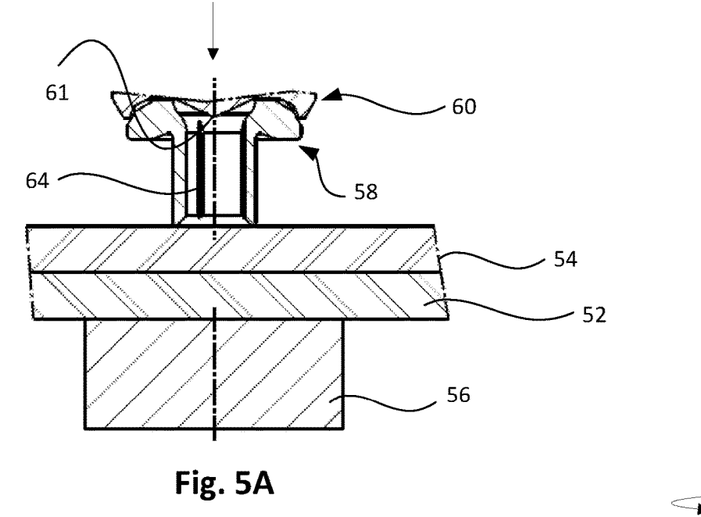
FIG. 5A is a view of a first step in the production of a component connection using a connecting element according to the invention as shown in FIG. 1.
Figure 5B:
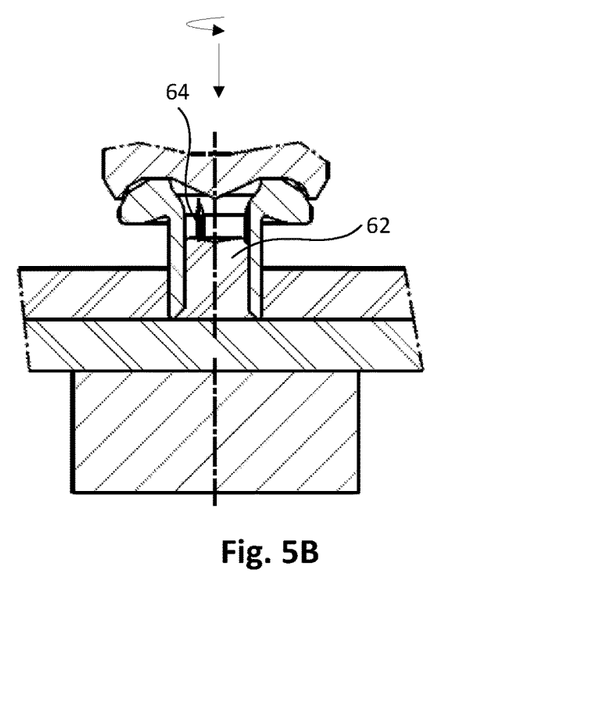
FIG. 5B is a view of a second step in the production of a component connection using a connecting element according to the invention as shown in FIG. 1.
Figure 5C:
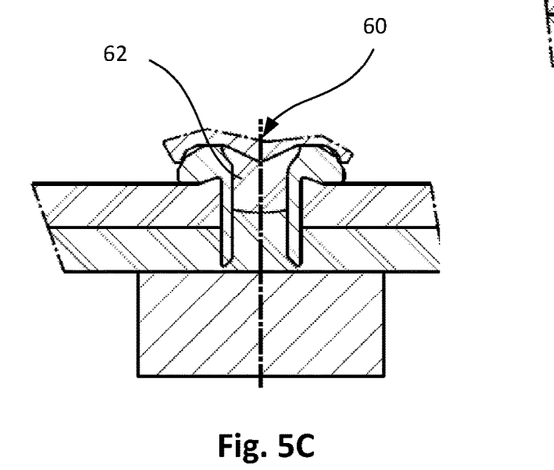
FIG. 5C is a view of a third step in the production of a component connection using a connecting element according to the invention as shown in FIG. 1.

FIG. 5A to FIG. 5C are exemplary views of the procedural steps of a method for producing a connection between a base layer 52, a top layer 54 and a connecting element 58 according to the invention which is hollow throughout, as seen in FIG. 1, for example.

The base layer 52 and the top layer 54 are held between an anvil 56 and a setting unit.

The setting unit comprises a drive tool 60 adapted to drive the connecting element 58 in a rotary motion. At the same time, the drive tool applies an axial contact pressure to the connecting element 58 in the driving direction. The drive tool 60 has a central bulge 61, in particular of a conical shape, which will protrude into the hollow space of connecting element 58 when contacting the latter. This acts to place the connecting element 58 on the top layer 54.

FIG. 5B is a view of a process step for the production of a component connection according to the invention, in which the connecting element 58 has cut a slug 62 out of the top layer 54 under rotation and contact pressure, which slug is accommodated in the hollow space. The slug is rotated by the driver structures 64, which are arranged within the hollow space, and forms a friction-welded joint with the material of the base layer 52 under contact pressure and rotation.

FIG. 5C shows the material of the slug 62 rising up as the connecting element penetrates the base layer 52 further. The material rises up to the drive tool 60 where it is laterally displaced by the bulge 61 in the drive tool. As a result, the slug 62 creates a positive connection via the connecting element 58 that is conically recessed at its head end. In this way, a reliable connection is made between the top layer 54 and the base layer 52 via the connecting element 58 and the slug 62.

Figures 6A, 6B:
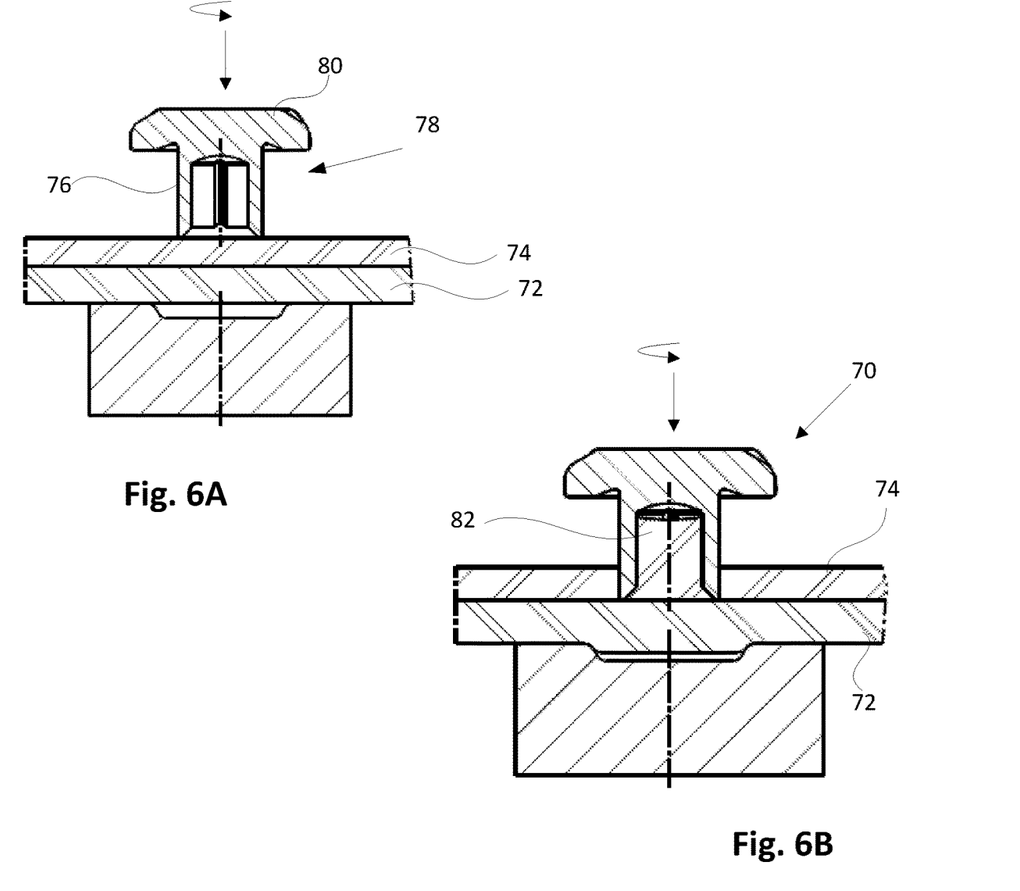
FIG. 6A is a view of a first step in the production of a component connection using a connecting element according to the invention as shown in FIG. 4.
FIG. 6B is a view of a second step in the production of a component connection using a connecting element according to the invention as shown in FIG. 4.
Figure 6C:
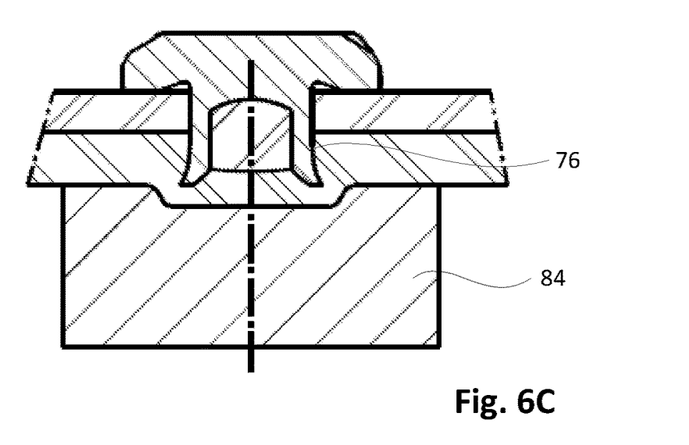
FIG. 6C is a view of a third step in the production of a component connection using a connecting element according to the invention as shown in FIG. 4.

FIGS. 6A to 6C show a further embodiment of the method for producing a component connection, which method is similar to the one described with reference to FIGS. 5A to 5C. The component connection comprises a base layer 72, a top layer 74 arranged thereon, and a connecting element 78 according to the invention, in particular according to FIG. 4. The connecting element 78 has a head 80 with a drive, which head 80 forms the end of the hollow shaft 76 of the connecting element 78. The base layer 72 and the top layer 74 are preferably made of aluminum, whereas the connecting element 78 is made of steel. As described above, the connecting element 78 is driven into the top layer 74 in a first cutting stage, preferably at a speed of more than 2,000 rpm, with the contact pressure being preferably less than 3 kN. The slug 82 is thus cut out of the material of the top layer 74 and entrained in the rotary movement of the connecting element 78 by the driver structures that are formed on the inside of the lateral surface, preferably taking the form of ribs extending parallel to the element center axis M, and is then welded to the top layer 74 via its front. Welding is preferably performed at a higher contact pressure than was used in the preceding cutting stage. The contact pressure force applied by the drive tool (not shown here) is transmitted onto the slug 82 via the head of the connecting element.

Furthermore, FIG. 6C shows the completed connection, with a material connection having been formed between the base layer 72 and the slug 82, for which the connecting element 78 is deformed in that the connecting element 78 penetrates the base layer 72 with the aid of an anvil 84, as in the case of a riveted connection, and is deformed in such a way that the end of the shaft 76 located in the base layer 72 flares outward and thus establishes a form-fit connection in the setting direction between the base layer 72 and the top layer 74. The riveting process is performed in particular using an increased contact pressure.

The slug 78 connected to the base layer 72 by friction welding thus provides an improved load-bearing capacity of the connection in the direction of shear, i.e. transversely to the setting direction.

The invention claimed is:

1. Method for the production of a component connection between a base layer (52, 72) and a top layer (54, 74), comprising the steps of:
driving and rotating a connecting element (10, 30, 40, 58, 78) having a hollow-cylindrical shaft (12, 42, 76) into said top layer (54, 74) while applying an axial force, thereby causing a slug (62, 82) to be cut out of said top layer (54, 74) by an interior of said hollow-cylindrical shaft, said slug being entrained by said connecting element as it rotates;
preventing deformation of said connecting element (10, 30, 40, 58, 78) when cutting said slug (62, 82) until said connecting element (10, 30, 40, 58, 78) has reached a surface of said base layer (52, 72);
after said connecting element passes through said top layer, welding said slug (62, 82) to said base layer (52, 72) under a rotational speed of at least 2000 rpm and under an axial force which is greater than said axial force used for cutting said slug (62, 82), and at least partially pressing said connecting element (10, 30, 40, 58, 78) into said base layer (52, 72).

2. Method according to claim 1, characterized in that said connecting element (10, 30, 40, 58, 78) has a head which terminates said hollow-cylindrical shaft (12, 42, 76) at an end opposite said hollow-cylindrical shaft (12, 42, 76), said head of said connecting element applying said axial force for welding to said slug (62, 82).

3. Method according to claim 1, characterized in that said hollow-cylindrical shaft (12, 42, 76) of said connecting element (10, 30, 40, 58, 78) is open and that contact pressure is applied to said slug (62, 82) by a setting tool that also applies contact pressure to said connecting element (10, 30, 40, 58, 78).

4. Method according to claim 1, characterized in that a welding axial force on said connecting element (10, 30, 40, 58, 78) and said slug (62, 82) is applied at decreasing speed with increased axial rivet force compared to said welding axial force to produce a positive connection in the axial direction with said base layer (52, 72) and/or said top layer (54, 74).

5. Method according to claim 4, characterized in that said connecting element (10, 30, 40, 58, 78) is open and that contact pressure is applied to said slug (62, 82) by a setting tool that also applies contact pressure to said connecting element (10, 30, 40, 58, 78), and, an end of said slug (62, 82) located opposite said hollow-cylindrical shaft (12, 42, 76) of said connecting element (10, 30, 40, 58, 78) is flared.

* * * * *